United States Patent
Geisler

[15] 3,662,592
[45] May 16, 1972

[54] NON-DESTRUCTIVE TESTING DEVICE FOR THE DETECTION OF FLAWS IN SOLID ROCKET MOTORS

[72] Inventor: Robert L. Geisler, P.O. Box 6037, Edwards, Calif. 93523

[22] Filed: Aug. 28, 1970
[21] Appl. No.: 67,825

[52] U.S. Cl. .............................................. 73/104
[51] Int. Cl. ........................... G01n 19/08, G01b 5/28
[58] Field of Search ........................ 73/15, 104, 105

[56] References Cited

UNITED STATES PATENTS 3,566,669  3/1971  Lawrence et al. ............... 73/15

*Primary Examiner*—Richard C. Queisser
*Assistant Examiner*—Herbert Goldstein
*Attorney*—Harry A. Herbert, Jr. and Arsen Tashjian

[57] ABSTRACT

The outer surface of an inflatable bladder is coated with a sensitizing material to make it sensitive to pressure and/or temperature. The bladder is then introduced through the nozzle of a rocket motor and inflated in the cavity. Depending upon the coating, the surface of the bladder becomes marked in a pattern corresponding to the imperfections in the surface of the rocket motor cavity. The bladder is deflated and removed from the rocket motor and inserted in a transparent cavity model and reinflated. The surface of the bladder on which the imperfection pattern marks appear is visually observed through the wall of the transparent model.

4 Claims, 7 Drawing Figures

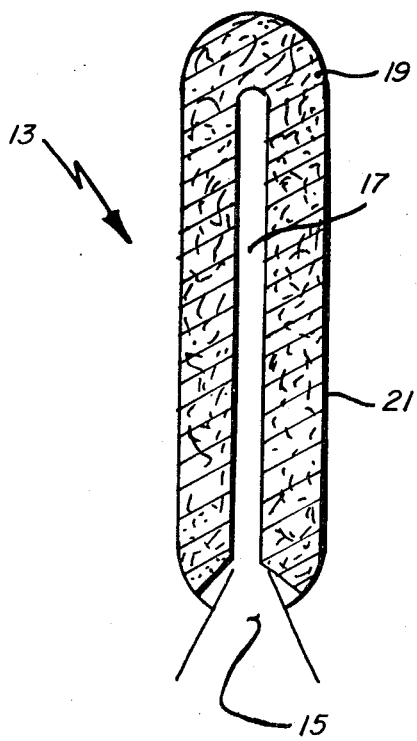
FIG.1
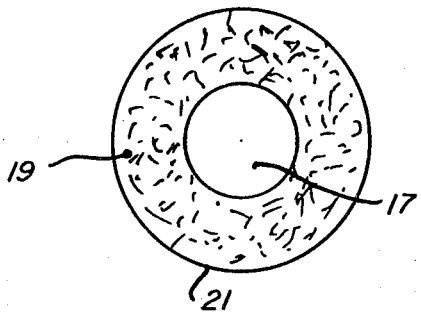
FIG.2-A
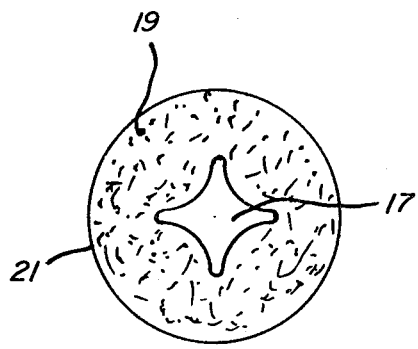
FIG.2-B
INVENTOR.
ROBERT L. GEISLER
BY Harry A Herbert, Jr.
and
Arsen Tashjian
ATTORNEYS INVENTOR.
ROBERT L. GEISLER
BY Harry A. Herbert Jr.
and
Arsen Tashjian
ATTORNEYS

NON-DESTRUCTIVE TESTING DEVICE FOR THE DETECTION OF FLAWS IN SOLID ROCKET MOTORS

BACKGROUND OF THE INVENTION

This invention relates to a device for inspecting the physical condition of the inner bore of a solid fuel rocket motor or any other cavity with a small access port. More particularly, the invention is concerned with providing a non-destructive testing device which is simple and easy to use in the field and requires no specialized training by the operating personnel.

While x-ray and other non-destructive testing devices are useful at the manufacturing facility, they are often too costly, bulky, or sophisticated for field use in the inspection of solid fuel rocket motor cavities. Many motors are stored in silos or other cramped locations where these presently known devices cannot be effectively utilized.

Another drawback of x-ray, ultrasonics and other presently known non-destructive testing procedures is that they are generally employed by passing energy from a source external to the motor, through the propellant grain, to a detection system located inside or on the other side of the motor. The propellant grain and case often attenuate or scatter this energy reducing the resolution of flaws which may be present on the inner bore. Also, there is always a certain danger when electrical and magnetic devices are located in close proximity to the highly inflammable rocket propellant grain.

Other disadvantages which arise when presently known devices are employed in the field for rocket motor inspection include the high cost of the equipment and the specialized skills required to set-up, operate, and interpret the results obtained. At best, the resolution of any discovered defects is limited and the results are generally unreliable. The large size and complexity of the heretofore employed devices as well as the tendency or possibility of inflicting damage to the rocket motor are objectionable features which create problems when field inspection is required.

SUMMARY OF THE INVENTION

This invention provides an extensible bladder or balloon for determining the physical condition of the inner bore of a rocket motor or the like and, more particularly, the invention is concerned with providing a balloon whose surface is treated with a pressure or heat sensitive coating and which, when inflated against the interior surface, receives an imprint or record of any flaws contacting the balloon.

Accordingly, it is an object of the invention to provide a device suitable for the inspection of a solid rocket motor in order to detect flaws in the inner bore. The device is also suitable for the inspection of other similarly shaped objects having limited access to an inner area.

Another object of the invention is to provide a device for determining the readiness and reliability of solid fuel rocket motors which are deployed in the field. Flaws in the inner bore of a rocket motor may generally impair the proper operation of the motor.

Still another object of the invention is to provide an inspection system which utilizes low cost elements to determine the physical condition of the inner bore of a solid rocket motor. The reduction of costs permits large numbers of units to be manufactured and distributed for on-the-spot inspection of the rocket motors after being deployed in the field.

A further object of the invention is to provide an inspection device for detecting flaws in the cavity of rocket motors which is simple in design and use. The simplicity permits operation of the device by relatively unskilled personnel with a minimum of previous training or experience.

A still further object of the invention is the provision of an inspection device for determining the inner bore condition of a solid fuel rocket motor especially as to the presence of voids or cracks. The device is also useful to determine the depth of such voids or cracks as well as their presence.

These and other objects, features and advantages will become more apparent after considering the following description taken in conjunction with the annexed drawings wherein like numbers are used throughout to identify like elements.

DESCRIPTION OF THE DRAWINGS

In the drawings:

FIG. 1 is a view in schematic of the cross-section of a typical solid fuel rocket motor showing the nozzle through which the device is inserted;

FIG. 2A is a cross-section of one type of rocket propellant grain;

FIG. 2B is a cross-section of another type of rocket propellant grain;

DESCRIPTION OF A PREFERRED EMBODIMENT

Figure 3A:
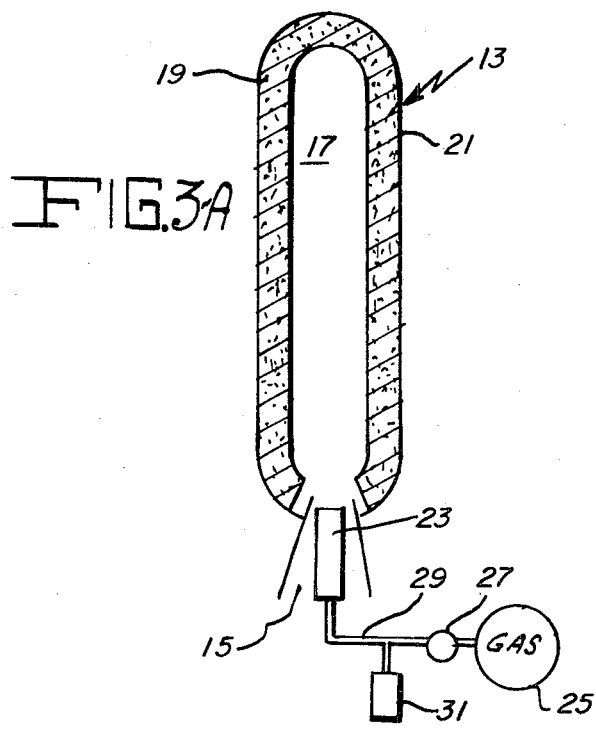
FIG. 3A is a schematic view in longitudinal cross-section of the device according to the invention ready to be inserted into the rocket motor cavity through the nozzle section.

Referring now to the drawings, there is schematically shown in longitudinal cross-section, a typical solid rocket motor designated generally by the numeral 13. The lower end of the motor 13 is provided with a nozzle 15 which communicates with the inner cavity 17. The propellant grain 19 surrounds the cavity 17 and is enclosed in the motor case 21. In FIGS. 2A and 2B there are shown typical cross-sections of two propellant grains. A circular cavity 17 is shown in FIG. 2A while a more complex star cavity 17 is shown in FIG. 2B. The present invention is primarily adapted for determining the physical condition and presence of flaws on the inner surface of the hollow propellant grain 19.

Figure 3B:
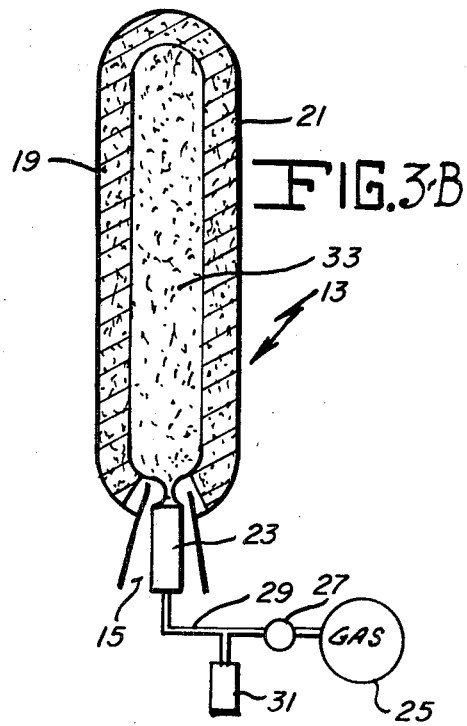
FIG. 3B shows the balloon in the inflated condition in the rocket motor cavity.

The system for accomplishing the above-described testing procedure is shown in FIGS. 3A through 3D. A canister 23 is inserted into the nozzle 15 of the rocket motor 13. In communication with the canister 23 is a gas supply 25 under pressure. A valve 27 is provided in the gas line 29 to control the flow of gas to the canister 23. Auxiliary means 31 are provided for introducing heat or secondary developing gas to the main gas supply 25 as it flows through the line 29. An inflatable bladder or balloon 33 shown in the inflated condition in FIG. 3B is caused to be expelled from the canister 23 by the pressurized gas from the gas supply 25. The balloon 33 is made to fit snugly within the cavity 17 of the rocket motor 13 and an image which indicates the physical condition of the inner bore is obtained on its outer surface.

Figure 3C:
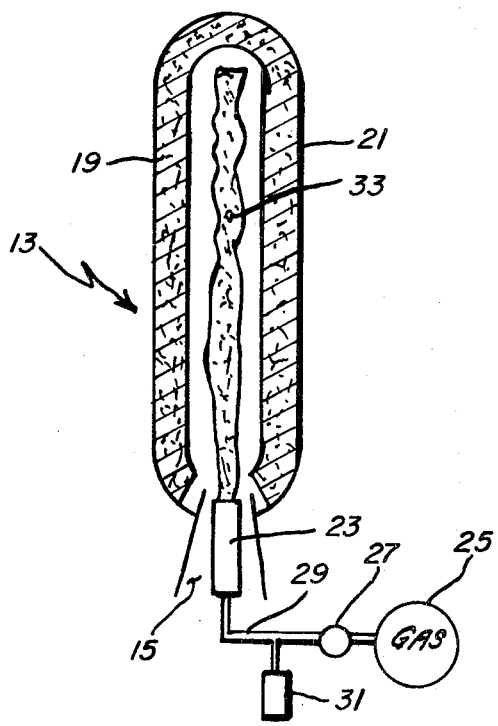
FIG. 3C shows the balloon after being marked and deflated ready for removal from the rocket motor cavity.

The balloon 33 is then deflated, as shown in FIG. 3C, and removed from the rocket motor cavity 17. In order to determine the physical condition of cavity surface, the balloon 33 is inserted into a clear plastic or glass model 35 of the motor cavity and reinflated. Any defect in the rocket cavity will show up on the balloon surface as an image 37 of the defect and can be visually observed through the wall of the transparent cavity model 35.

MODE OF OPERATION

The hereinbefore described device for the detection of flaws in the inner cavity of a solid fuel rocket motor provides a simple and efficient solution to the problem of testing the operating condition of solid rocket motors deployed in the field.

In operation, the inflatable bladder or balloon 33 is constructed such that, upon inflation to a suitable pressure, it is placed in intimate contact with the interior surface of the cavity 17 to be inspected. The drawing, FIGS. 3A through 3D, shows the use of the present invention for the inspection of the cavity of a typical rocket motor 13. The invention is also useful for the inspection of other cavities. For example, it could be used to inspect the inner surface of pipes and vessels used in the chemical process industry or interiors of nuclear reactor parts. It can also be used to inspect the interior of fuel tanks and storage vessels.

In practice, the balloon 33 is coated with a sensitizing material of which many types are available. One such type of coating is pressure sensitive and includes encapsulated dye or ink wherein a color is produced where the micro capsules are broken by applied force. In this case, the coating will be "-developed" where it contacts the surface and not "developed" where it spans a flaw because of the lack of contact force in these regions. An outline of the flaw is thereby produced between the "developed" and undeveloped regions. Undesired "development" of the coating during insertion and extraction is avoided by designing the coating such that it can be activated or deactivated during the desired phases of the inspection process. Heat or chemical gases from the auxiliary means 31 can be introduced to accomplish this by increasing the pressure sensitivity only during the time when the inserted balloon 33 is in contact with the surface to be inspected.

Figure 3D:
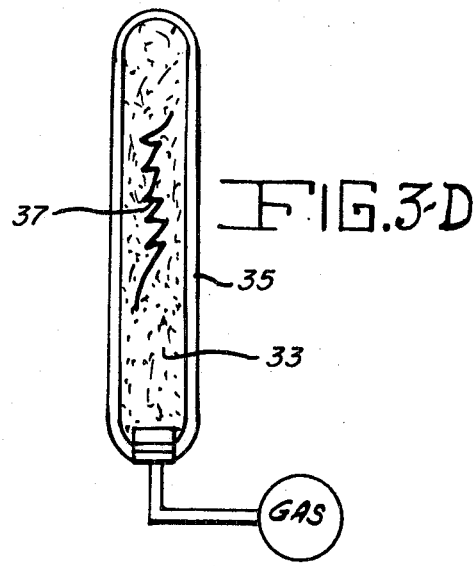
FIG. 3D shows the marked balloon reinflated in the transparent cavity model so that the surface markings can be observed.

Temperature sensitive coatings can also be used to produce flaw images 37 shown in FIG. 3D. Liquid crystals and thermochromic materials of this type are well known in the art. The coated balloon 33 is positioned by insertion into the rocket motor cavity and warm gas is introduced. Heat transfer is greatest at the points of contact with the surface and lowest where the balloon 33 spans the flaw. As the gas temperature is increased, it will "develop" the flaw image since it will reach the development temperature due to its lower heat transfer rate. The balloon 33 is then cooled, deflated, and removed. Crack volume or depth can be estimated by taking into account exposure time and total heat flux. The total volume of gas in the flaw can be estimated and hence, its depth.

Another newly developed system for detecting flaws in cavities utilizes sound sensitive films. The balloon 33 is coated with a frequency sensitive material which is used to locate flaws and determine their length, width and volume. The balloon 33 serves as a membrane over the flaw. When sound waves are generated in the balloon 33, the frequency dependent coating is developed when the resonant frequency of the flaw volume is reached. Thus, through several tests the flaw volume can be bracketed and its depth estimated.

The balloon 33 sensitized in one of the above-described procedures is introduced through the access port of the rocket nozzle 15 and inflated in the cavity 17. It is "developed" and deflated and removed. It is then reinflated in a transparent model 35 of the cavity for inspection. The location and dimensions of the flaws 37 are then observed and recorded. Future disposition of the inspected object is then determined based upon these findings.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use in other inspection and detection operations where it is necessary to provide simple, fast, and reliable equipment for field inspection of the inner surfaces of limited access cavities.

Having thus set forth and disclosed the nature of my invention, what I claim and desire to secure by Letters Patent of the United States is:

1. A testing device for the detection of flaws on the wall of the inner cavity of a solid rocket motor comprising, an extensible bladder, a sensitive coating disposed on the outer surface of said bladder for producing a visible image when said bladder is in contact with a surface containing a flaw, a canister for containing said bladder while in a completely deflated condition, said canister being for positioning in the nozzle port of the solid rocket motor, pressurized gas means in communication with the interior of said bladder in said canister, said gas means operable to expel said bladder from said canister into the cavity of the solid rocket motor and inflate said bladder until it fits snugly within the cavity to produce marks on said sensitive coating which correspond to flaws in the cavity wall, and a transparent plastic model of the rocket motor cavity for inserting the extensible blatter after removal from the rocket motor whereby the blatter may be reinflated to expand against the inner walls of said model thereby revealing, by visual observation, any flaws which are present on the inner surface of the rocket motor cavity and which are imaged on said sensitive outer surface coating of said extensible bladder.

2. The testing device defined in claim 1 wherein an auxiliary means is located in a line between said pressurized gas means and said bladder for introducing heat and secondary developing gas as the gas flows through the line.

3. The testing device defined in claim 2 wherein the sensitive coating disposed on the outer surface of said bladder is temperature sensitive and includes liquid crystals of thermochromic materials wherein an image of the flaw in the rocket motor cavity is produced when a warm gas is introduced into said bladder after being inflated to fit snugly within the cavity of the solid rocket motor.

4. The testing device defined in claim 1 wherein the sensitive coating disposed on the outer surface of said bladder is pressure sensitive and includes encapsulated dye wherein a color is produced when micro capsules are broken by applied force produced when said bladder is inflated to fit snugly within the cavity of the solid rocket motor.

* * * * *